United States Patent
Anderson

(10) Patent No.: US 6,966,032 B1
(45) Date of Patent: Nov. 15, 2005

(54) AUDIO ASSISTED SETUP APPARATUS AND METHOD

(75) Inventor: Glen J. Anderson, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/409,500

(22) Filed: Sep. 30, 1999

(51) Int. Cl.$^7$ .............................................. G06F 3/00
(52) U.S. Cl. ...................... 715/708; 700/94; 434/319
(58) Field of Search .................. 700/94; 381/114; 40/124.1, 455, 902

(56) References Cited

U.S. PATENT DOCUMENTS

| | | | | |
|---|---|---|---|---|
| 4,607,747 A | | 8/1986 | Steiner ........................ 206/232 |
| 4,611,262 A | * | 9/1986 | Galloway et al. ........... 361/813 |
| 5,063,698 A | | 11/1991 | Johnson et al. ............ 40/124.1 |
| 5,228,859 A | | 7/1993 | Rowe ......................... 434/118 |
| 5,577,918 A | * | 11/1996 | Crowell ....................... 434/319 |
| 5,687,334 A | * | 11/1997 | Davis et al. ................ 395/339 |
| 5,719,920 A | | 2/1998 | Harman ....................... 379/88 |
| 5,782,642 A | | 7/1998 | Goren .................... 434/307 R |
| 5,815,586 A | * | 9/1998 | Dobbins ..................... 381/124 |
| 5,828,768 A | * | 10/1998 | Eatwell et al. ............. 381/333 |
| 5,853,372 A | * | 12/1998 | Britton ....................... 600/500 |
| 5,903,266 A | * | 5/1999 | Berstis et al. ............... 345/338 |
| 6,075,534 A | * | 6/2000 | VanBuskirk et al. ........ 345/348 |

\* cited by examiner

Primary Examiner—Sinh Tran
Assistant Examiner—Andrew Flanders
(74) Attorney, Agent, or Firm—R. Christopher Rueppell; Suiter West Swantz PC LLO

(57) ABSTRACT

An audio assisted setup apparatus and method include providing a set of audio instructions stored in a memory, and presented to a computer purchaser to assist in setup of a computer system. The apparatus is activated automatically upon a triggering event, and runs before the computer is set up.

31 Claims, 4 Drawing Sheets

AUDIO ASSISTED SETUP APPARATUS AND METHOD

FIELD

The present invention relates generally to computer system assembly and setup, and more specifically to assembly and set assistance.

BACKGROUND

Many modern consumers purchase personal computer systems through manufacturers that sell computers over the Internet or World Wide Web. Users buying computers in this manner have the opportunity to select the options they wish to have on their computer, including the type and size of monitors, processor speed, memory, storage, audio and video cards, speakers, printers, CD-ROM and DVD drives, and the like.

Manufacturers typically assemble the computer system internal components such as memory, storage, audio and video cards, processor, and the like into the main central processing unit (CPU) of the computer. However, monitors, speakers, keyboards, pointing devices such as a mouse, external storage and drives, printers, and the like are typically shipped with the computer system, but unassembled. A set of written instructions is often included with the computer system. The instructions provide the user with assembly information for the peripheral components of the system.

Some computer manufacturers color code cords and cables with matching color ports on the CPU to assist the user in connection of the proper cables to the proper ports. However, not all manufacturers do this, and not all ports and cables can be color coded for ease of assembly. Further, while color coded cables and assembly instructions may assist in setup, computer manufacturers get many telephone calls to customer support for users attempting to assemble a computer system. Often, consumers who call customer service lines are required to provide a quantity of information about the computer system, requiring extra time and effort to locate serial numbers and the like, or are placed on hold waiting for a customer service representative. Hold times vary by day and hour, so a customer calling during a busy time may be placed on hold for a period of fifteen minutes or more. Being placed on hold is irritating to consumers, and a requirement to determine information often thought by users to be unnecessary is also irritating to consumers.

It would be desirable, therefore, to provide a user further instructions for assembling a computer.

SUMMARY

The present invention overcomes the problems of known systems by providing an audio setup assistant which activates automatically to assist setup.

In one embodiment, an audio assisted setup apparatus includes a processor, a memory operatively connected to the processor, the memory containing audio file instructions for setting up a computer system, a speaker connected to the processor, and a set of controls for controlling the operation of the audio file instructions. The setup apparatus is automatically activated upon a triggering event such as the opening of a box or impingement of light on a triggering photo diode or the like.

In another embodiment, a method of assisting a user in set up of a computer system includes providing a self-contained apparatus containing a set of audio instructions presentable to the user upon actuation of the apparatus, activating the apparatus upon the occurrence of a triggering event, and allowing the user to control the presentation of audio instructions.

In yet another embodiment, a packing container for a computer system includes a container capable of holding computer system components, and an audio assisted setup apparatus affixed to the container, the apparatus activated to provide audio startup instructions to assist a user in setting up a computer system.

Other embodiments are described and claimed.

DESCRIPTION OF EMBODIMENTS

In the following detailed description of embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
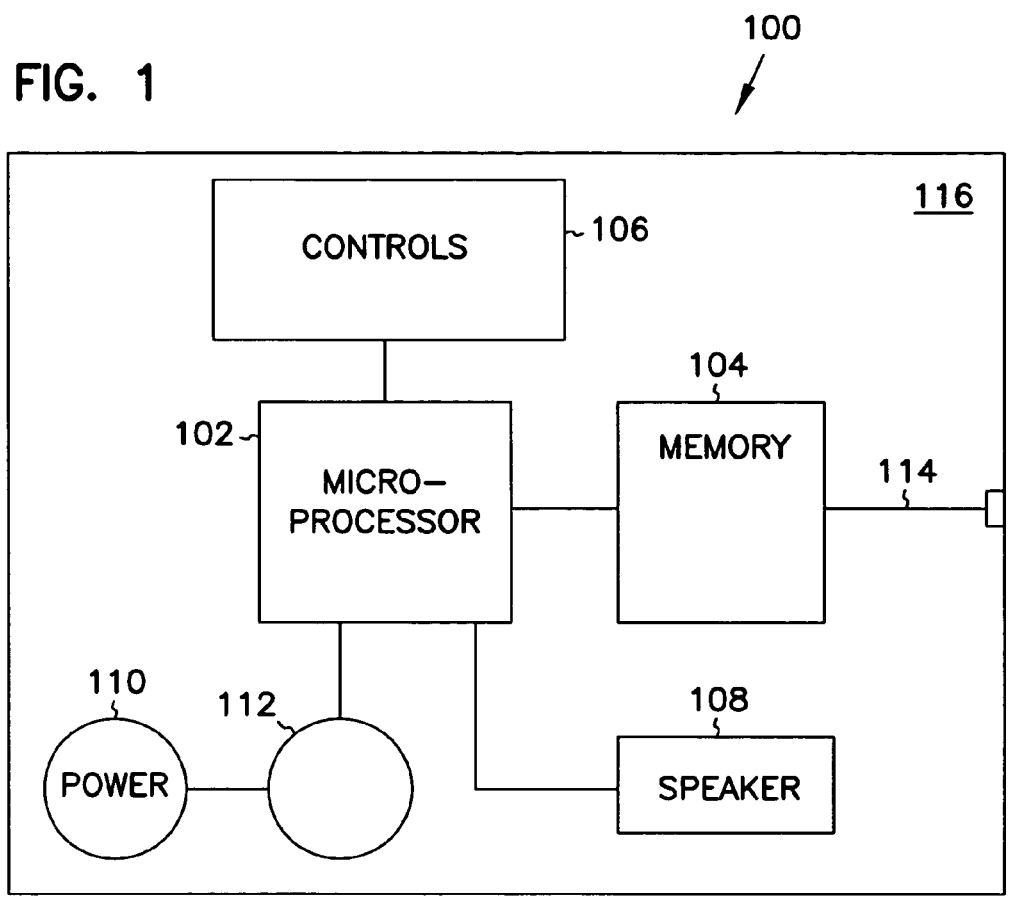
FIG. 1 is a schematic block diagram of an apparatus embodiment of the present invention.

FIG. 1 is a schematic block diagram view of one embodiment 100 of an audio assisted setup device according to the present invention. Apparatus 100 comprises a processor 102 operatively connected to a memory 104, a set of controls 106, a speaker 108, and a power supply 110. The memory 104 contains instructions for executing a program to provide audio instructions for setting up a computer. The instructions are presented to a user through the speaker 108, which in one embodiment is a piezoelectric speaker.

When the apparatus is activated, before the computer system is set up, the apparatus in one embodiment issues a first comment or instruction automatically. Automatic activation of the apparatus may be by one of many methods. In one embodiment, an actuator 112 connects the power supply 110 to the microprocessor 102 upon the occurrence of an activating event. For example, the activating event could be opening a box in which the apparatus 100 is placed. In another embodiment, the apparatus could be activated by exposing the apparatus to light. In other embodiments, the actuator 112 is connected to provide an actuation signal to the processor 102 to trigger the operation of the apparatus 100.

In one embodiment, the actuator 112 is a switch which is closed upon the activating event. In another embodiment, the actuator 112 is a photo diode which completes a circuit between the power supply 110 and the processor 102 when a predetermined level of light is incident upon the photo diode. In other embodiments, the actuation of the apparatus is triggered by an activating event.

The apparatus does not consume much power. Power supply 110 therefore does not need to be excessive. In various embodiments, the power supply 110 is a button cell battery, a solar strip, or the like.

In one embodiment, the components of apparatus 100 are mounted on mounting structure 116. Mounting structure 116 may be attached or mounted to any number of physical locations including but not limited to a box flap for a box containing computer system components, an actual component, or the like. In another embodiment, the mounting structure 116 is a printed circuit board.

A series of audio instructions playable by the speaker 108 are stored in the memory 104. The instructions stored in the memory 104 are accessed by the processor 102 in response to commands issued by the user via the controls 106. The instructions stored in memory 104 are in one embodiment programmed into memory 104 through a signal input connection 114. Signal input connection 114 is in one embodiment a proprietary communications protocol connector so as to prevent corruption of the audio instructions inadvertently by a user. In another embodiment, a standard data connection is utilized for signal input connection 114.

Figure 2:
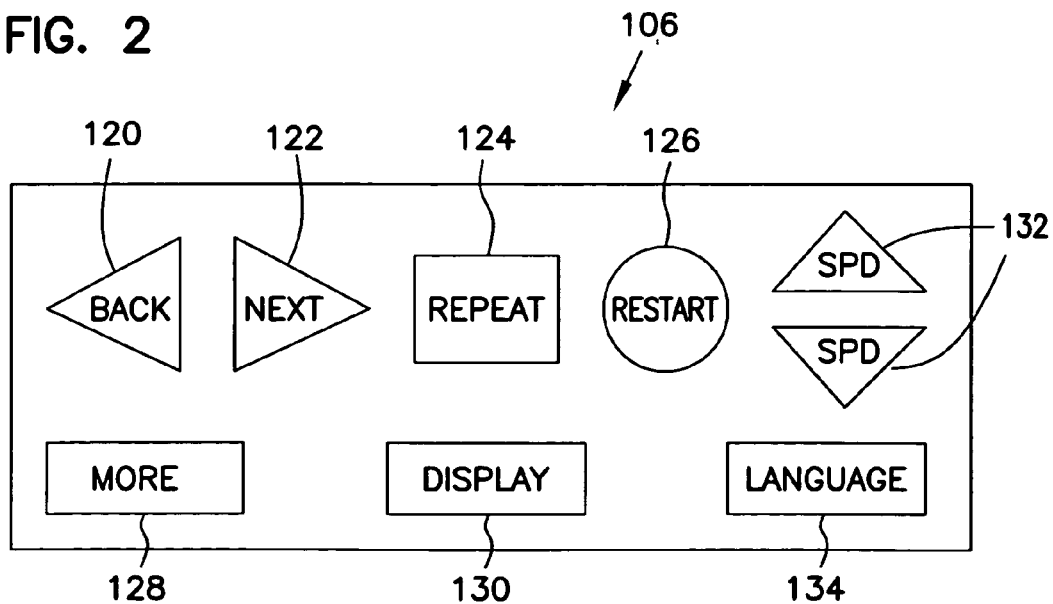
FIG. 2 is a representative view of one embodiment of a set of controls for the present invention.

Controls 106 serve to allow a user to control the presentation of information presented by apparatus 100. A representative set of control 106 is shown in greater detail in FIG. 2. Controls 106 comprise buttons or other actuating configurations including by way of example only and not by way of limitation back button 120, next button 122, repeat button 124, restart button 126, more button 128, voice speed buttons 132, and language button 134. Additionally, controls 106 in one embodiment further include a display screen 130. Display may be a small liquid crystal display (LCD), or a series of light emitting diodes (LEDs) or the like sufficient to display basic information such as the number of the audio instruction being played.

In one embodiment, instructions for operating the apparatus 100 are printed directly on the apparatus 100. If the user wishes at a later time to review certain instructions, or wishes to utilize the instructions to set up the computer once again after it has been moved, the user can reinitiate the operation of apparats 100 to provide setup instructions once again.

The set of audio instructions stored in memory are presented in sequential fashion, presenting a complete set of instructions to the user for setting up the computer system. The user may repeat instructions, replay certain instructions, restart the instruction set, increase or decrease the speed of playback, all by pressing the appropriate buttons on the controls 106. Back button 120 moves back one instruction in the instruction set. Forward button 122 moves forward one instruction in the instruction set. Repeat button 124 repeats the last instruction. Restart button 126 restarts the instruction set from the beginning. More button 128 gives the user further detail on the current instruction in the instruction set. Speed buttons 132 increase or decrease the speed of the playback of the audio instructions. Language button 134 changes the language of the instructions of the instruction set.

Display 130 in one embodiment displays a number of the instruction set corresponding to a numbered set of written instructions also provided with the computer system. In another embodiment, the display also includes a label for the instruction to assist the user in determining which instruction is being presented. The user can use the display to move forward or backward in the instruction set to a specific numbered step by using the display to rapidly navigate the instruction set. In this embodiment, the audio setup instructions need not be presented in sequential order. The user can skip to a specific instruction. In another embodiment, controls 106 include a numeric keypad so the user can enter the number of a specific instruction to hear.

Figure 3A:
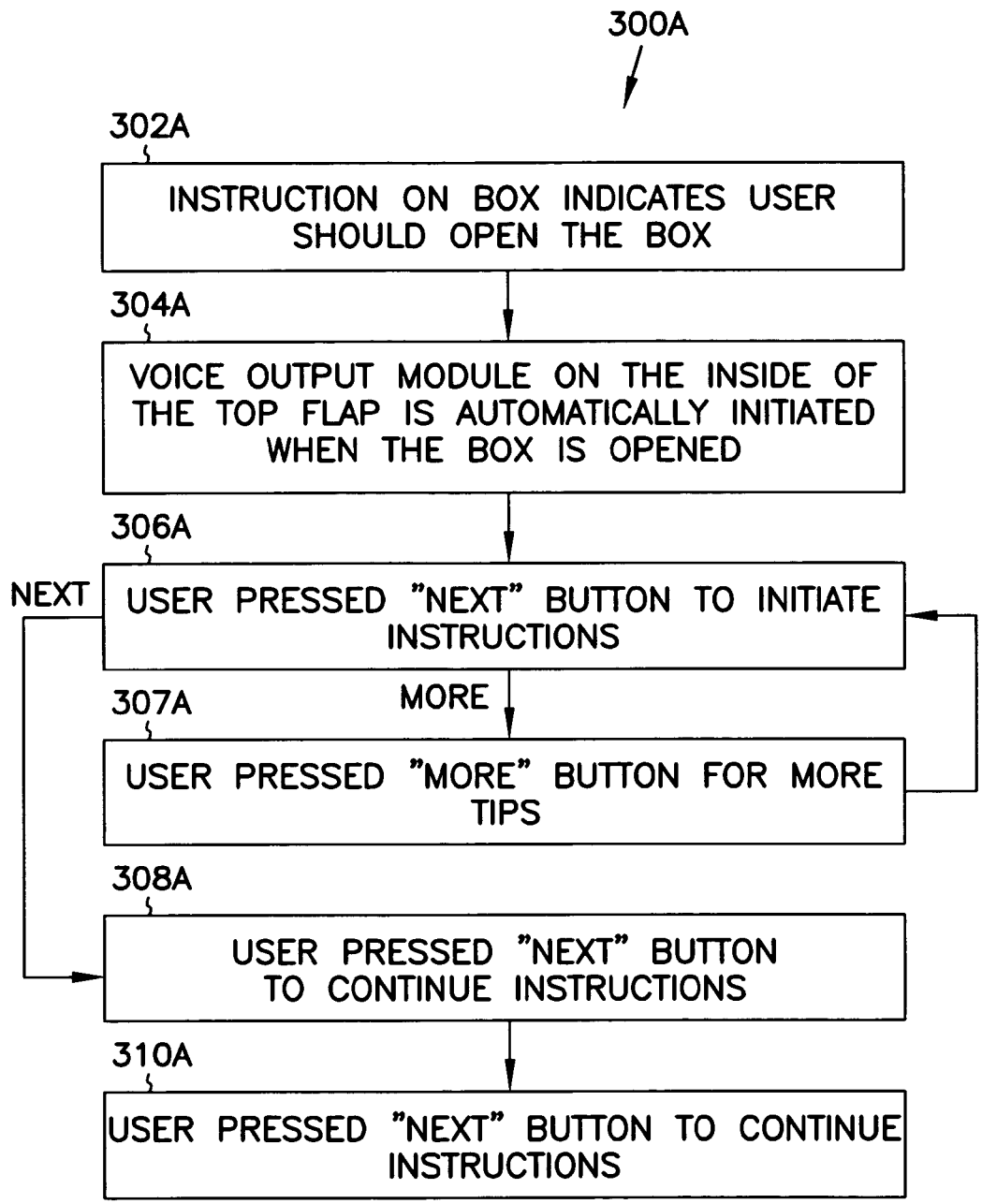
FIG. 3A is a flow chart diagram of a method embodiment of the present invention.
Figure 3B:
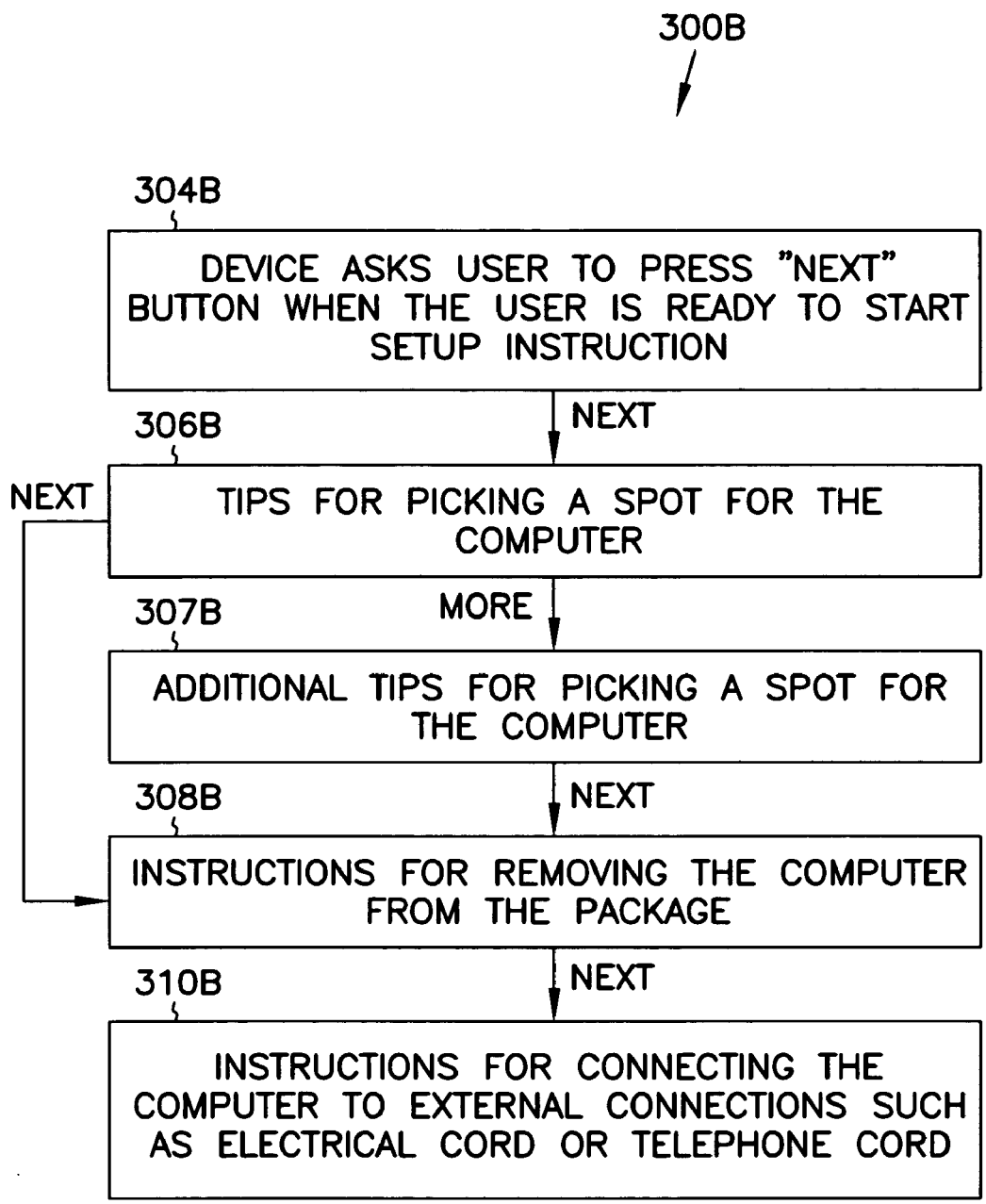
FIG. 3B is a flow chart diagram of representative audio instructions of an embodiment of the present invention.

FIGS. 3A and 3B are flow chart diagrams of process flow 300A and corresponding audio instructions 300B. Identical numbers with A and B suffixes correspond to matching process flow and audio instructions in FIGS. 3A and 3B. A method embodiment 300A for a process of a user utilizing the audio instructions comprises providing instructions either on the box or actually on the apparatus such as apparatus 100 in block 302A, activating an audio instruction module in block 304A, and presenting either the next instruction or more instructions in blocks 306A, 307A, 308A, and 310A.

Corresponding instructions are shown in FIG. 3B. In response to the user opening the computer box or otherwise initiating the audio assisted setup apparatus such as apparatus 100 in block 302A and the audio assisted setup module being activated in block 304A, a representative example of the first voice instruction presented to the user is shown in block 304B. In response to the user pressing the "next" button in block 306A, the instructions shown in block 306B are presented to the user. If the user desires more information, the user can press the more button 128 on controls 106 as shown in block 307A to be presented with the further instructions in block 307B. Further instructions presented in response to user commands to controls 106 are shown in blocks 308B and 310B. It should be understood that further instructions may be part of the setup process, and that only a representative sample of instructions are shown in FIGS. 3A and 3B.

Figure 4:
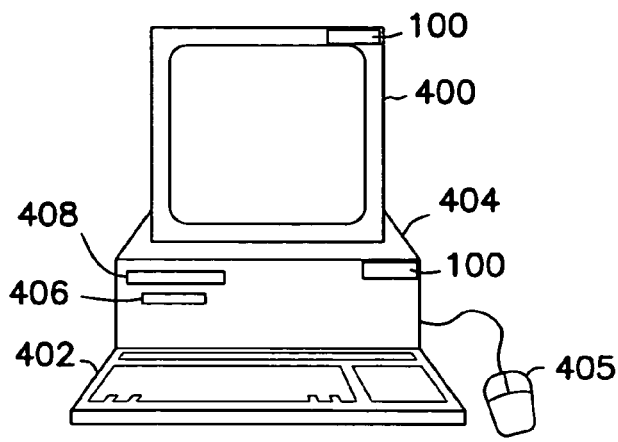
FIG. 4 is a perspective view of a computer system embodiment of the present invention.

Desktop computers, as shown in FIG. 4, typically include a monitor 400, keyboard input 402, central processing unit 404, and a pointing or selection device such as mouse 405. Further components of a typical computer system may include a machine readable storage media such as disk drive 406, hard disk, CD-ROM 408, DVD, modem, and the like. The processor unit of such a computer typically includes a microprocessor, memory (RAM and ROM), and other peripheral circuitry, not shown. An audio setup apparatus such as apparatus 100 in various embodiments as has been described above is attached to or affixed to monitor 400, CPU 404, or other peripherals. Such computers are some of the types of host devices on which embodiments of the present invention may be employed.

Figure 5:
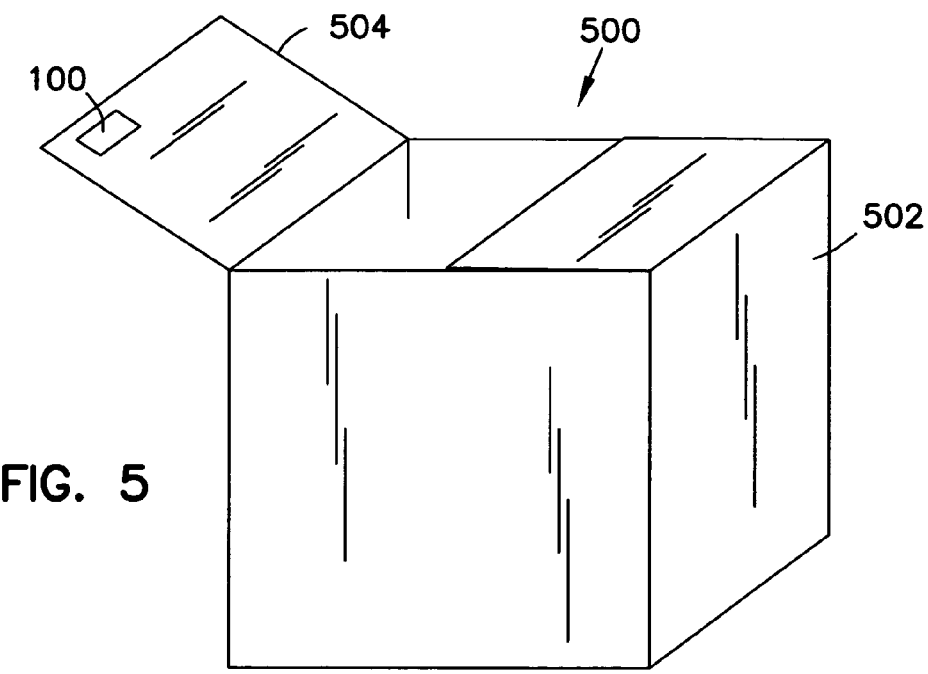
FIG. 5 is a perspective view of a container embodiment of the present invention.

In another embodiment shown in FIG. 5, an apparatus such as apparatus 100 is affixed to or attached to a box in which a computer system or parts thereof are shipped to a user. When the user opens the box, the apparatus is activated. In the embodiment 500 shown, box 502 has an audio assisted setup apparatus such as apparatus 100 attached to flap 504. When flap 504 is opened, apparatus 100 is activated to guide the user through the setup procedure as described above.

Figure 6:
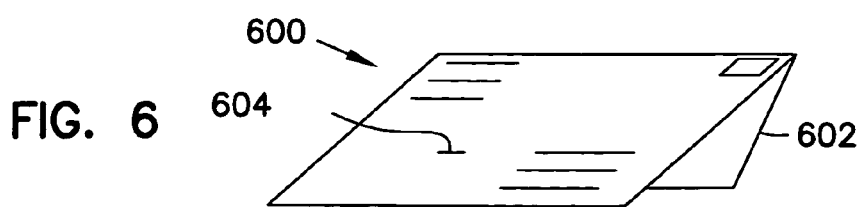
FIG. 6 is a perspective view of another embodiment of the present invention.

In another embodiment 600 shown in FIG. 6, an audio assisted setup apparatus 602 is configured to have a fold over flap 604 with address information printed thereon. Once the user is finished with the apparatus 602, the user folds the flap 604 over, seals the embodiment 600, and mails the apparatus back to the manufacturer. The manufacturer can then re-use or re-program and re-use the apparatus for another computer system. Also, if a computer user desires to have audio instructions sent to the user, the embodiment 600 can be mailed from the manufacturer to the user, and be set to activate upon opening of the flap 604.

Methods 300A and 300B and apparatuses 100 and 106 in one embodiment comprise computer programs written to provide audio instructions to assist a user in setup of a computer system as shown in FIG. 4. The computer programs run on the dedicated processor of the apparatus out of memory 104, and may be transferred to main memory from some form of permanent storage via signal input 114 when stored on removable media or via a network connection or modem connection, or via other types of computer or machine readable medium from which it can be read and utilized. The computer programs comprise multiple modules or objects to perform the methods 300A and 300B, or the functions of the modules in apparatus 100. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. An audio assisted computer setup apparatus, comprising:
    a processor;
    a memory operatively connected to the processor, the memory containing audio file instructions for setting up a computer system;
    a photo diode operatively connected to the processor, the photo diode for receiving light;
    a speaker connected to the processor; and
    a set of controls for controlling the operation of the audio file instructions;
    wherein the setup apparatus is activated upon the photo diode being exposed to a predetermined level of light before the computer system is set up.

2. The apparatus of claim 1, wherein the speaker is a piezoelectric speaker.

3. The apparatus of claim 1, wherein the controls comprise a selection consisting essentially of back, next, repeat, restart, more, language select and speed select options.

4. The apparatus of claim 1, wherein the set of controls further comprises a display which displays an instruction number and instruction label for the audio instruction being presented by the audio assisted setup apparatus.

5. The apparatus of claim 1, wherein the apparatus is affixed to a computer component.

6. The apparatus of claim 1, wherein the apparatus is affixed to a packing container of a computer system.

7. The apparatus of claim 1, and further comprising:
    a mailing flap which folds over the apparatus to allow the apparatus to be mailed.

8. A packing container for a computer system, comprising:
    a container capable of holding computer system components; and
    an audio assisted setup apparatus affixed to the container, the apparatus being activated upon the impingement of a predetermined level of incident light upon the apparatus, the audio assisted setup apparatus providing audio startup instructions to assist a user in setting up a computer system.

9. The packing container for a computer system of claim 8, wherein the apparatus is configured to be activated in response to the packing container being opened.

10. A computer system, comprising:
    a computer; and
    an audio assisted setup apparatus affixed to a component of the computer, the audio assisted setup apparatus, comprising:
        a processor;
        a memory operatively connected to the processor, the memory containing audio file instructions for setting up a computer system;
        a photo diode operatively connected to the processor, the photo diode for receiving light;
        a speaker connected to the processor; and
        a set of controls for controlling the operation of the audio file instructions;
        wherein the audio assisted setup apparatus is activated upon the photo diode being exposed to a predetermined level of light, the activation of the audio assisted setup apparatus for providing audio startup instructions to assist a user in setting the system up.

11. The apparatus of claim 10, wherein the speaker is a piezoelectric speaker.

12. The apparatus of claim 10, wherein the controls comprise a selection consisting essentially of back, next, repeat, restart, more, language select and speed select options.

13. The apparatus of claim 10, wherein the set of controls further comprises a display which displays an instruction number and instruction label for the audio instruction being presented by the audio assisted setup apparatus.

14. The computer system of claim 10, wherein the apparatus is configured to be activated in response to a packing container for the computer system being opened.

15. A method of assisting a user in set up of a computer system, comprising:
   providing a self-contained apparatus containing a set of audio instructions presentable to the user upon actuation of the apparatus;
   activating the apparatus upon the occurrence of an impingement of a predetermined level of light on the apparatus; and
   allowing the user to control the presentation of audio instructions.

16. The method of claim 15, and further comprising:
   providing additional instructions if the user desires additional instructions.

17. The method of claim 15, and further comprising:
   allowing the user to repeat an instruction.

18. The method of claim 15, and further comprising:
   allowing the user to adjust the speed of presentation of the audio instructions.

19. The method of claim 15, allowing the user to restart the audio instructions from the beginning.

20. The method of claim 15, and further comprising:
   displaying a legend indicating the instruction number and label corresponding to printed instructions.

21. The method of claim 15, wherein the set of audio instructions are instructions for setting up the computer system.

22. A machine readable medium comprising machine executable instruction for causing a processor to perform a method comprising:
   providing a user a set of audio instructions for setting up a computer system; and
   activating the set of audio instructions upon the impingement of a predetermined level of light upon a photo diode operatively connected to the processor.

23. The machine readable medium of claim 22, wherein the method further comprises:
   providing additional instructions if the user desires additional instructions.

24. The method of claim 22, and further comprising:
   allowing the user to repeat an instruction.

25. The method of claim 22, and further comprising:
   allowing the user to adjust the speed of presentation of the audio instructions.

26. The method of claim 22, allowing the user to restart the audio instructions from the beginning.

27. The method of claim 22, and further comprising:
   displaying a legend indicating the instruction number and label corresponding to printed instructions.

28. An audio assisted computer setup apparatus, comprising:
   a processor;
   a memory operatively connected to the processor, the memory containing audio file instructions for setting up a computer system;
   a speaker connected to the processor;
   a set of controls for controlling the operation of the audio file instructions; and
   a mailing flap which folds over the apparatus to allow the apparatus to be mailed;
   wherein the setup apparatus is activated upon a triggering event before the computer system is set up.

29. The apparatus of claim 28, further comprising a photo diode for receiving light.

30. The apparatus of claim 29, wherein the photo diode activates the apparatus when a predetermined level of light is incident upon the photo diode.

31. The apparatus of claim 28, wherein the opening of the mailing flap activates the apparatus.

* * * * *